US008406175B2

(12) United States Patent
Santivanez et al.

(10) Patent No.: US 8,406,175 B2
(45) Date of Patent: Mar. 26, 2013

(54) CARRIER SENSE MULTIPLE ACCESS (CSMA) PROTOCOL WITH MULTI-PACKET RECEPTION (MPR) IN A WIRELESS AD HOC NETWORK

(75) Inventors: Cesar A. Santivanez, Boston, MA (US); Gentian Jakllari, Cambridge, MA (US); Jason Keith Redi, Belmont, MA (US)

(73) Assignee: Raytheon BBN Technologies Corp., Cambridge, MA (US)

( * ) Notice: Subject to any disclaimer, the term of this patent is extended or adjusted under 35 U.S.C. 154(b) by 511 days.

(21) Appl. No.: 12/709,330

(22) Filed: Feb. 19, 2010

(65) Prior Publication Data

US 2011/0205961 A1    Aug. 25, 2011

(51) Int. Cl.
*H04W 4/00* (2009.01)
*H04B 7/212* (2006.01)
*H04L 12/413* (2006.01)

(52) U.S. Cl. ......... 370/328; 370/338; 370/347; 370/445

(58) Field of Classification Search .................. None
See application file for complete search history.

(56) References Cited

U.S. PATENT DOCUMENTS

| 7,321,580 | B1 | 1/2008 | Ramanathan et al. | |
|---|---|---|---|---|
| 2002/0152324 | A1* | 10/2002 | Sherman | 709/245 |
| 2006/0221992 | A1 | 10/2006 | Chan et al. | |
| 2007/0097892 | A1* | 5/2007 | Tsang | 370/310 |
| 2008/0153502 | A1* | 6/2008 | Park et al. | 455/446 |
| 2009/0086706 | A1 | 4/2009 | Huang et al. | |
| 2009/0122779 | A1* | 5/2009 | Gonzalez-Velazquez | 370/345 |

OTHER PUBLICATIONS

Acharya et al., "MACA-P: A MAC for Concurrent Transmissions in a Multi-hop Wireless Networks", Percom, p. 505, First IEEE International Conference on Pervasive Computing and Communications (2003).
Bandyopadhyay et al., "An Adaptive MAC Protocol for Wireless Ad Hoc Community Network (WACNet) Using Electronically Steerable Passive Array Radiator Antenna", Proc. of the GLOBECOM 2001, Nov. 25-29, (2001).
Li et al., "Smart Contention Resolution in Random Access Wireless Networks with Unknown Multiple Users: A Joint Layer Design Approach", Conference on Communications, 2003. ICC'03 (2003).
Mostofa et al., "System Architecture for Implementing Multiuser Detector Within an Ad-Hoc Network", MILCOM, vol. 2 pp. 1119-1123 (2001).
Orfanos et al., "MC-CDMA Based IEEE 802.11 Wireless LAN", Proceedings of the the IEEE Computer Society's 12th Annual International Symposium on Modeling, Analysis, and Simulation of Computer and Telecommunications Systems (MASCOTS'04) (2004).
Rahman et al., "Hidden Problems with the Hidden Node Problem", 23rd Biennial Symposium on Communications (2006).

(Continued)

*Primary Examiner* — Derrick Ferris
*Assistant Examiner* — Kodzovi Acolatse
(74) *Attorney, Agent, or Firm* — Ropes & Gray LLP

(57) ABSTRACT

This invention relates to systems and methods for communication in a wireless ad hoc network that employs multi-packet reception. The wireless network includes a transmitting node configured to transmit a control packet to a receiving node while other nodes within a transmission range of the transmitting node are involved in ongoing communication. The receiving node is configured to receive the control packet while simultaneously receiving a second packet from a second transmitting node, and to process the control packet without aborting the receiving of the second packet. Methods for transmitting and receiving multiple packets simultaneously are also presented.

32 Claims, 7 Drawing Sheets

OTHER PUBLICATIONS

Rodoplu et al., "Position Based CDMA with Multiuser Detection (P-CDMA/MUD) for Wireless Ad Hoc Networks", Spread Spectrum Techniques and Applications, 2000 IEEE Sixth International Symposium, vol. 1 pp. 336-340 (2000).

Xu et al., "How Effective is the IEEE 802.11 RTS/CTS Handshake in Ad Hoc Networks?", Globecom—New York, vol. 1, pp. 72-76 (2002).

* cited by examiner

322

|  | 1st TxOp (362) | 2nd TxOp (364) |
|---|---|---|
| 102a | DUR = $T_{AE}$<br>DIR = FR 102e<br>PWR = 20 dBm — 354 | |
| 102b | DUR = $T_{BI}$<br>DIR = TO 102i — 356<br>PWR = 20 dBm | |
| 102i | DUR = $T_{BI}$<br>DIR = FR 102b<br>PWR = 20 dBm | DUR = $T_{DI}$<br>DIR = FR 102d<br>PWR = 20 dBm |
| 102j | — 358 | — 360 |
| ... | | |

(rows bracketed as 352)

NAV table maintained at node 102c for neighbors
of node 102c (for K = 2, and n = 0)

FIGURE 4

CARRIER SENSE MULTIPLE ACCESS (CSMA) PROTOCOL WITH MULTI-PACKET RECEPTION (MPR) IN A WIRELESS AD HOC NETWORK

GOVERNMENT CONTRACT INFORMATION

This invention was made with Government support under Contract No. DAAD19-01-2-0011, awarded by the U.S. Army Research Lab (ARL). The Government has certain rights in this invention.

TECHNICAL FIELD

This invention relates to computer networking, and is particularly applicable, without limitation, to wireless ad-hoc networks that employ a carrier sense multiple access (CSMA) communication protocol.

BACKGROUND

A wireless ad hoc network refers to an autonomous system of fixed or mobile nodes connected by wireless links, the union of which form an arbitrary network topology in which nodes can serve as relay points for communication between other nodes. A mobile ad hoc network refers to a wireless ad hoc network in which the nodes are free to move randomly and to organize themselves arbitrarily. Ad hoc wireless networks continue to rise is popularity because they requires minimal configuration, are quick to deploy, and can be used in situations where fixed communication infrastructure does not exist or has been destroyed.

Nodes in a wireless ad hoc network often communicate using a carrier sense multiple access (CSMA) communication protocol under the IEEE 802.11 standard. Nodes in a CSMA protocol contend for access to a shared transmission medium or channel. A node wishing to transmit a packet (the "sender node") first listens to (or "carrier-senses") the shared medium for a defined duration to determine if there are any transmissions on the medium, and transmits only if the medium is sensed idle. Carrier sensing is usually determined by antenna sensitivity and controlled by thresholds applied to the level of (actual or apparent) perceived signal strength. In order to combat interference from hidden nodes (i.e., nodes that are capable of interfering with reception of a packet at a receiving node while not necessarily being able to receive the transmitted packet), some CSMA protocols supplement physical sensing with a reservation scheme (also known as virtual sensing). In the reservation-based CSMA, nodes exchange short request to send (RTS) and clear to send (CTS) packets with neighboring nodes prior to the actual transmission. Both packets specify the length of time needed to transmit the actual data packet. Any third party node receiving any of the two packets uses this information to predict when the medium will be available for a future transmission, and must refrain from initiating any communication until the medium is free. On the receiving side, the collision avoidance model of CSMA requires that a packet be received in the absence of any interference for the reception to be deemed successful. The complete exchange is a four-way handshake involving four packets—RTS, CTS, DATA, and ACK—with the final ACK providing notification of successful transmissions from the target node back to the sender node.

The resource allocation and collision avoidance models of the conventional CSMA protocol, however, are overly pessimistic. Specifically, these models of conventional CSMA fail to exploit the capability of the underlying physical layer module of the network to successfully decode multiple packets received in overlapping transmissions, referred to herein as multi-user detection (MUD) or multi-packet reception (MPR). These pessimistic models result in fewer nodes being able to transmit at any given time due to unnecessary backoffs resulting from sensing another carrier on the medium. On the reception side, receiving nodes may unnecessarily abort transmissions due to perceived interference, even when the physical layer module has successfully decoded the received packets.

SUMMARY

This invention relates to systems and methods for communication between nodes in a wireless ad hoc network that employs multi-packet reception. The invention can be employed in a wireless ad hoc network having fixed or mobile nodes. While embodiments of the invention are described in the context of wireless ad hoc networks, the systems and methods described herein can be applied to infrastructure-based or wired networks, without departing from the principles of the invention. A node in the wireless ad hoc network of the present invention can be involved in a "targeted communication" or an "untargeted communication" when communicating with other nodes. As used herein, a node is involved in a "targeted communication" if the node is either the receiving node or the transmitting node of a DATA packet in a CSMA transaction. In contrast, a node that is not the intended recipient or the sender of the DATA packet, is involved in an "untargeted communication" when it receives an RTS or a CTS notification sent by the sender or the intended recipient of the DATA packet to their respective neighbors. For example, in a four-way CSMA handshake transaction, both the transmitting node that initiates the CSMA transaction in order to transmit a DATA packet, and the receiving node that authorizes the transaction by sending a CTS packet in order to receive the DATA packet, are involved in a targeted communication. However, neighbors of the transmitting and receiving nodes that receive an RTS or a CTS notification of the future DATA transmission between the receiving node and the transmitting node are involved in an untargeted communication with respect to the particular future DATA transmission associated with the RTS and CTS notifications. As described below, aspects of the invention exploit the multi-user-detection (MUD) capabilities of the physical layer radio such that a node can be involved in a targeted communication and one or more untargeted communications at the same time without aborting the targeted communication. As used herein, a "packet" refers to a datagram, a frame, a message, or other definable collection of bits in a transmission.

According to one aspect, the wireless ad hoc network that employs multi-packet reception (MPR) includes a transmitting node and a receiving node. The transmitting node is configured to transmit a control packet (e.g., an RTS or a CTS packet) to the receiving node while other nodes within a transmission range of the transmitting node are involved in targeted or untargeted communication, the control packet indicating a duration of a future transmission of a data packet for which the transmitting node is either the addressed-to recipient or the sender. The receiving node is configured to receive the control packet while simultaneously receiving a second packet from a second transmitting node, to record the duration of the future transmission of the data packet, and to predict a future time that the receiving node can initiate a transmission to the transmitting node based on the recorded duration.

According to another aspect, a receiving node in the wireless ad hoc network with MPR includes a radio in the physical layer module and an access controller located in the MAC layer module. As used herein, a "module" includes any combination of software, hardware, firmware, or computer-readable medium storing computer executable instructions for causing a processor to carry out steps defined by those instructions. The radio in the receiving node is configured to decode multiple packets received in overlapping transmissions over a wireless transmission medium. As used herein, the term "overlapping transmissions" refers to multiple transmissions received by a receiving node at least partially at the same time. That is, overlapping transmissions need not be completely contemporaneous, so long as at least portions of the overlapping transmission are received at the same time. The access controller is configured to receive the multiple decoded packets from the radio while the receiving node is involved in a targeted communication with a first transmitting node. The access controller is configured to detect that at least one of the multiple decoded packets is associated with an untargeted communication from one or more second transmitting nodes, and to process the at least one packet without aborting the targeted communication. In an embodiment, the receiving node processes the at least one packet by updating a network allocation vector (NAV) entry maintained separately by the receiving node for each one of its one-hop neighbors (including the one or more second transmitting nodes). In this embodiment, each NAV entry is a vector having a vector element for each targeted communication in which the particular neighbor is engaged. Each vector element can include a duration of the targeted communication, as well as a direction of the communication and the transmit power level of the communication. The optional information included in the NAV entry can be used by transmitting nodes to improve throughput in the network by opportunistically transmitting additional packets when such transmissions have a reduced power or are limited in direction so as not to interfere with other targeted communications. In an embodiment, the receiving node includes a forwarding layer module configured to receive the multiple decoded packets and to place the packets in a prioritized forwarding queue that gives a higher priority to the packet that has traveled the farthest distance.

According to a third aspect, a transmitting node in the wireless ad hoc network that employs multi-packet reception includes an access controller in the MAC layer module configured to initiate a sensing request to determine whether a transmission medium is available for transmitting a packet from the transmitting node to a receiving node. The transmitting node also includes a multi-user detection (MUD) interface configured to detect the number of transmissions on the transmission medium of the network. The transmitting node further includes an MUD compliance module (MCM) in communication with the MAC layer module and the MUD interface. The MCM is configured to receive the sensing request from the access controller in the MAC layer module and to provide a response to the access controller based on network allocation vector (NAV) entries maintained by the MCM, and the number of transmissions on the transmission medium. In an embodiment, the MCM is configured to permit the transmitting node to transmit the packet in the presence of other transmissions on the transmission medium if the number of transmissions on the medium does not exceed the MUD capacity, K, of the physical layer radio, where K is an integer greater than 1. In an embodiment, the MCM prevents the transmitting node from transmitting the packet if, based on information in the NAV, the receiving node is currently involved in a targeted communication with another node.

The MUD capacity K of the physical layer radio refers to the maximum number of overlapping transmissions ("opportunities") that the physical layer radio can decode simultaneously. There are several ways to achieve multi-packet reception, and hence an MUD capacity of greater than 1. In an embodiment, a node in the wireless network utilizes an approach similar to a conventional code division multiple access (CDMA) technique. CDMA employs spread-spectrum technology and a special coding scheme (where each transmitter is assigned a code or signature) to allow multiple users to be multiplexed over the same physical channel. Overlapping transmissions can be distinguished by exploiting different codes or signatures associated with the received packets. In another embodiment, multi-packet reception can be achieved between packets having the same signature or code provided the packets are transmitted using different power levels, or are separated by a recoverable delay or offset. In yet other embodiments, a node achieves MPR by splitting the transmission spectrum into multiple non-overlapping channels (e.g., FDMA systems) or by employing multiple antennas (e.g., antennas arrays, directional antennas, MIMO, etc.). In such embodiments, the MUD capacity of the physical layer radio is equal to the number of multi-channels or the number of receive antennas. Multi-channel and multi-antenna embodiments may not be desirable for certain application because they require extra hardware, such as additional transceivers or antennas. In contrast, embodiments that utilize code or signature division can be employed provided that the node is equipped with sufficient processing power to perform computations required for signal distinctions, or where the acquisition of extra processing power is cheaper than adding an extra transponder or an extra antenna. Theoretically, a node can simultaneously decode any number of overlapping transmission, provided the node possesses enough processing power. However, in practice, the MUD level (K) is selected to achieve a desired data rate (i.e., the "full rate") per packet received to optimize the efficiency gains of moving from a single-user detection (SUD) to an MUD system. In an embodiment, data packets are transmitted at a full-rate while control packets (e.g., RTS, CTS, ACK) are transmitted at a reduced rate. This enables a node to simultaneously decode a data packet and a control packet without also requiring a reduction in the transmission rate of the data packet.

In an embodiment, the MCM reserves a subset (n) of the K transmit opportunities for exchanging control packets with hidden nodes, in order to reduce packet loss due to interference from hidden nodes. Persons skilled in the art understand that the RTS/CTS handshake in CSMA cannot eliminate all interferences from hidden nodes. Specifically, the effectiveness of the RTS/CTS handshake in reducing interference is limited since certain nodes that are still capable of interfering with reception at the receiving node may remain outside of the transmission range of both the transmitting and the receiving nodes, and hence, fail to receive the RTS or CTS message. While it is possible to expand the sensing area of the transmitting node to address the hidden node problem, physical limits on the sensitivity of the antennas limit the effectiveness of this approach. In addition, potential false positives from a lowered sensing threshold may result in unnecessary backoffs that could result in an even lower throughput that is possibly below one that could be achieve by simply ignoring the hidden node problem. In such embodiments, the MCM allows the transmitting node to transmit the packet to the receiving node only if the number of transmissions "covering" the receiving node and any one of the immediate neighbors of the transmitting node does not exceed K−n. In an embodiment, the MCM estimates the total number of transmissions covering a node based on the number of targeted communications in which the node is engaged (using the NAV entries for the node). Additionally, the MCM can improve this estimate to include the number of untargeted communications potentially involving the node. In an embodiment, the MCM estimates the number of untargeted communication covering a neighboring node using pathloss information, direction of communications in the NAV entries, and knowledge regarding the topology of the two-hop neighborhood. The precise value of n (i.e., the number of transmit opportunities reserved for receiving control signals from hidden nodes) may be fixed or may vary depending on the spacing between the nodes of the network, the sensitivity of the receive antennas, the number of hidden node within the interference range of the transmitting node or the receiving node, the transmission power of the packets, or other suitable criteria.

BRIEF DESCRIPTION OF THE FIGURES

The foregoing and other objects and advantages of the invention will be appreciated more fully from the following further description thereof, with reference to the accompanying drawings. These depicted embodiments are to be understood as illustrative of the invention and not as limiting in any way:

FIG. 4 is a schematic diagram of a NAV reservation table maintained by a node for ongoing communications at neighboring nodes in the network depicted in FIG. 1, according to an illustrative embodiment of the invention;

DETAILED DESCRIPTION OF ILLUSTRATIVE EMBODIMENTS

To provide an overall understanding of the invention, certain illustrative embodiments will now be described, including systems and methods for communication between nodes in a wireless ad hoc network that exploits the multi-user detection (MUD) capability of the physical layer module to improve the end-to-end throughput of the network. However, it will be understood by one of ordinary skill in the art that the systems and methods described herein may be adapted and modified as is appropriate for the application being addressed and that the systems and methods described herein may be employed in other suitable applications, and that such other additions and modifications will not depart from the scope hereof.

Figure 1:
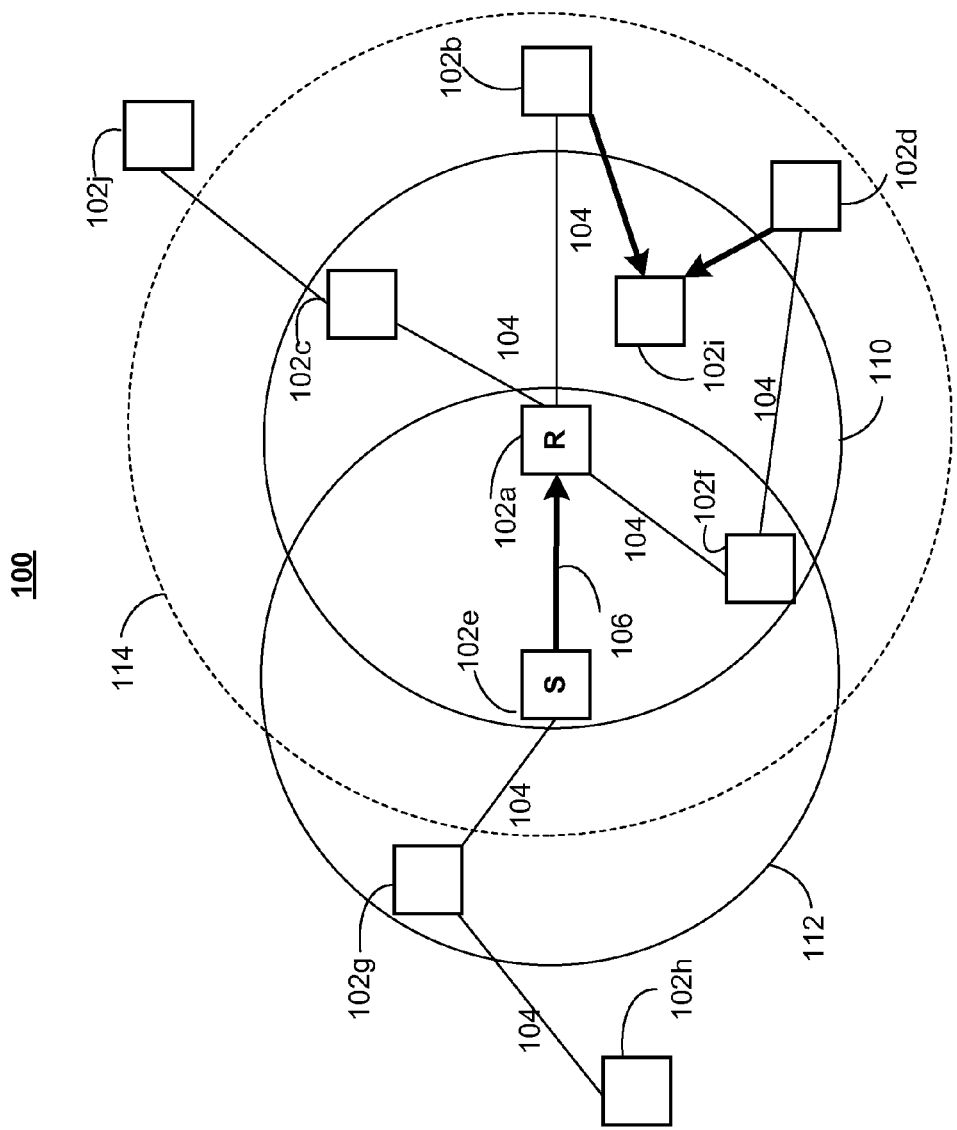
FIG. 1 is a schematic diagram of a network in which illustrative embodiments of the invention operate.

FIG. 1 shows a schematic diagram of a wireless network 100 that includes nodes 102a-102j (generally referred to as nodes 102). Nodes 102 may be periodically interconnected via transmission media of channels 104. As used herein, the term "channel" refers to a path of communication between two or more points. As such, channels 104 can be electromagnetic or wireless links between two or more nodes 102. Any one of nodes 102 can be any suitable device having wireless communication capabilities, including, without limitation, a desktop computer, a laptop computer, a personal data assistant, a mobile telephone, a portable computer, a router, a gaming console, an embedded computer in a household appliance, or other computing device. Nodes 102 exchange information in the form of data packets, also known as frames, between other nodes 102 via channels 104. The present invention is implemented in wireless network 100 for enhancing the performance of network 100 in terms of capacity, throughput, and robustness. Wireless network 100 may be an ad hoc network with fixed and/or mobile nodes. The network 100 can operate in a standalone fashion, or may be connected to the larger network. Although the present invention is advantageously implemented in an ad-hoc network, it may alternatively be implemented in a network of nodes having a fixed communication infrastructure, or infrastructure that includes both fixed and movable components.

In an embodiment, the nodes 102 exchange information using an enhanced CSMA protocol that enables and exploits multi-packet reception (MPR) to improve the end-to-end throughput of the network 100. For simplicity, node 102e will be referred to hereinafter as the sending node, and node 102a will be referred to hereinafter as the target node with reference to communication at the MAC layer level. A sending node is used to distinguish one of the nodes 102 that initiates a CSMA sequence (e.g., by sending an RTS message) in order to transmit a data packet, and a target node is used to distinguish one of the nodes 102 for which the data packet is destined. The term "transmitting" is used with respect to physical layer communication actions and, is used herein to distinguish one of nodes 102 that requires access to channels 104 in order to transmit a data packet or a control packet to one or more of others nodes 102. In contrast, the term "receiving" is used with respect to physical layer communication actions and, is used herein to distinguish another one or more of nodes 102 to which the transmitted data packet or control packet is addressed. For simplicity, node 102e will also be referred to hereinafter as the transmitting node, and node 102a will also be referred to hereinafter as the receiving node with reference to communication at the physical layer level. However, it is understood that in the course of a single CSMA transaction, (which includes the exchange of RTS, CTS, DATA, and ACK packets) the role of transmitting node and receiving node can be reversed between the two nodes. For example, during a CSMA transaction, the sending node 102e at the MAC layer level could be the receiving node at the physical layer level (e.g., the node 102e could be receiving a CTS or an ACK response packet from the target node 102a. Similarly, the target node 102a could be transmitting a response packet to the sender node. Although the present invention is described in terms of one of nodes 102 being the transmitting/sender node and another one of nodes 102 being the target/receiving node, it should be understood that at any given instant others of nodes 102 may be a transmitting/sender node or a receiving/target node. In addition, transmissions from transmitting node 102e may be addressed to multiple receiving nodes 102a (e.g., in a multi-cast or broadcast transmission).

In a conventional CSMA protocol, the sending node 102e listens to the channel 104 for a defined duration to determine whether the channel 104 is clear for the sending node 102e to transmit a data message to the target node 102a. If the sending node 102e detects no communications on the channel 104 for the defined duration, the sending node 102e transmits a Request to Send (RTS) message to the target node 102a, as well as all one-hop (i.e., immediate) neighbors of the sending node 102e. The RTS message includes the duration of the future data transmission from the sending node 102e. If no other node 102 is transmitting a message to the target node 102a and if the target node 102a does not detect other potentially interfering transmissions from neighboring nodes, the target node 102a transmits a Clear to Send (CTS) message to the sending node 102e, as well as all one-hop neighbors of the target node 102a, indicating to the sending node 102e that it can begin transmitting the data packet. Like the RTS message, the CTS message also includes the duration of the future data transmission. As noted above, the RTS message is broadcast to all immediate neighbors of the sending node 102e, and the CTS message is broadcast to all immediate neighbors of the target node 102a. In the example of FIG. 1, the immediate neighbors of the sending node 102e include all nodes 102 within the transmission range 112, and the immediate neighbors of the target node 102a include all nodes 102 within the transmission range 110. The neighbors that receive the message record the time at which they receive the RTS and CTS messages, along with the expected duration of the corresponding data transmission indicated in the RTS and CTS messages. Based on this information, the neighbors predict a future time that the channel is next going to be available for transmission. According to the conventional CSMA protocol, the time period between the transmission of the CTS message and the expected duration of the data transmission defines a time window during which neighboring nodes are to refrain from initiating any transmissions of their own. This time window is stored in a network allocation vector (NAV) that is maintained at each of nodes 102 to track the availability of the channel 104. In response to receiving the CTS message, the transmitting node 102e begins the data transmission using a DATA packet. The receiving node 102a responds with an ACK message if the packet is received successfully in the absence of any other transmission on the channel.

In the present invention, nodes 102 of the network 100 communicate according to an enhanced CSMA protocol that permits overlapping transmissions on the channels 104. The enhanced CSMA protocol improves on the conventional CSMA protocol in a number of ways. For example, unlike the nodes in conventional CSMA, sending node 102e can transmit an RTS message on channel 104 even in the presence of other ongoing communications on the channel, provided that target node 102a is not itself involved in a targeted communication, and the number of overlapping transmissions on the channel 104 is below a predefined number. Also unlike conventional CSMA, a NAV in the enhanced CSMA protocol is multidimensional. That is, where the maximum number of allowed overlapping transmissions is greater than 1, the NAV entry for a particular neighboring node is itself a vector, where each element of the vector includes information regarding one of the targeted communications in which a node is engaged. Using the NAV, a sending node 102e can determine which ones of its neighbors are currently involved in targeted communications. In an embodiment, the NAV entry for each neighbor node indicates whether the neighbor node is transmitting a data packet or receiving a data packet in the CSMA transaction. Based in part on the information in the NAV, each of the nodes 102 can determine whether it can initiate communication to another one of the nodes 102 despite ongoing communications on the transmission medium 104. An enhanced NAV that may be used in accordance with an aspect of the present invention is described in relation to FIG. 4.

In addition to the aforementioned improvements, the collision avoidance model in the enhanced CSMA protocol of the present invention is relaxed to take into account that multiple communications may be occurring on the channel 104 at any particular time. Specifically, unlike conventional CSMA, while the transmission 106 between nodes 102e and 102a is ongoing, the receiving node 102a can process one or more packets from another transmission (e.g., an RTS or CTS packet) without aborting the transmission from transmitting node 102e. The modifications to the collision avoidance model may mitigate throughput losses due to the hidden node problem. As used herein, a hidden node refers to a node that is located outside of the transmission range of another node. For example, in network 100, nodes 102b, 102d, 102h, and 102j are hidden from both transmitting node 102e and receiving node 102a, and hence do not receive the RTS/CTS exchange between the two nodes. The hidden node problem refers to channel collisions and interferences that occur between transmissions initiated by a hidden node into the interference zone of a receiving node of another transmission, leading to a loss of one or both transmissions. For example, in a conventional CSMA protocol, transmission of a control packet from node 102d to node 102i, during the exchange between nodes 102e and 102a, will not be received by node 102i because both nodes are located within the interference zone 114 of the receiving node 102a. A transmission from node 102j (located outside the interference zone 114) to node 102c will also fail due to interference. In addition, the receiving node 102a can detect these transmissions as interferences, causing the MAC layer module of the receiving node 102a to abort its own transmission with node 102e even if the physical layer module can separate the different packets. In the present invention, as described in more detail below, some or all of these transmissions can be processed without aborting the transmission between nodes 102e and 102a.

Figure 2:
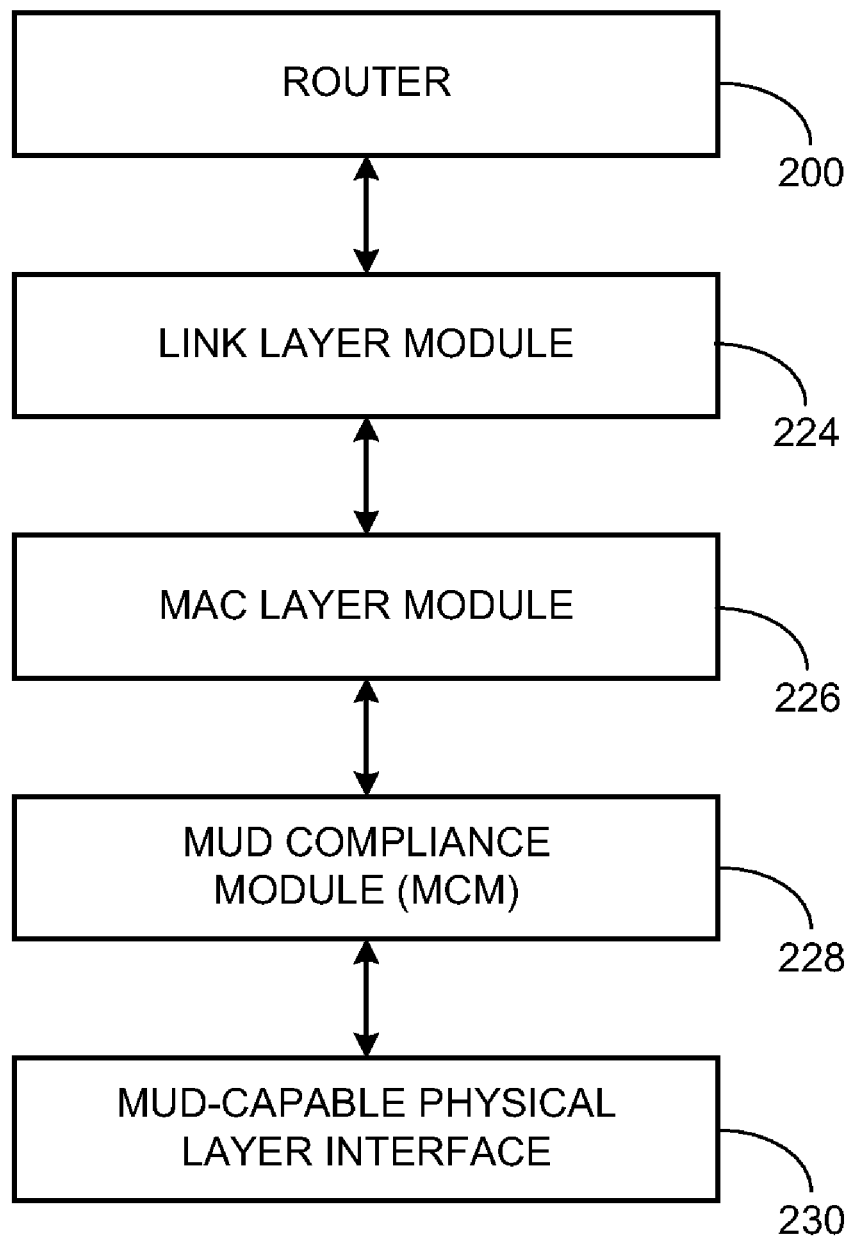
FIG. 2 is a schematic diagram of a node operating on the network depicted in FIG. 1, according to an illustrative embodiment of the invention.

FIG. 2 shows a block diagram of one of nodes 102 within the wireless network 100. Node 102 includes a router 200. The router 200 is a device at node 102 that is capable of forwarding data packets for transmission, based on network layer information. In an embodiment, the router 200 also participates in running one or more network layer routing protocols in order to exchange information with other nodes 102, the information being used by the router 200 to compute routes for the transmission of data packets.

The router 200 receives data packets from an application executed on a computing platform in communication with the router 200. The data packets can be segments of a message generated by the application. The message can be e-mail, data files, audio files, video files, etc. The segments are generally configured to be a predetermined (fixed or variable) size. A data packet typically includes a header, a payload, and a trailer. The header may include information regarding the data packet, such as the packet length, synchronization bits, a packet number, a source identification, a destination identification, etc. The payload is body or actual data content of the data packet to be delivered to the node(s) specified in the destination identification. The trailer typically includes an end-of-packet identifier informing a receiving node that it has reached the end of the packet. The trailer may also include error detection and/or correction coding to be used by the receiving node to improve reliability in the wireless network 100.

In an embodiment, the router 200 evaluates each of the data packets and generates a radio profile specific to each data packet. The radio profile can indicate the specific radio attributes to be used for the particular transmission, including an antenna mode (either omnidirectional or directional) and a transmit power level. In addition, the radio profile may include one or more of a required or desired data rate, maximum number of transmission attempts, packet priority, frequency, forward error correction (FEC) coding, and time to remain "alive" in a forwarding queue. A link layer module 224 is in communication with the router 200. As known to those skilled in the art, the link layer module 224 is a protocol layer module that accepts data packets from the router 200, manages queues, and manages the number of retries (i.e., retransmissions) of data packets upon unsuccessful transmission of data packets. In an embodiment, when two packets are received simultaneously at the link layer module 224, the packet with the larger propagation distance (i.e., that traveled the farthest) is assigned a higher priority in a prioritized forwarding queue managed by the link layer module 224. The link layer module 224 is also in communication with a media access control (MAC) layer module 226 of the present invention. The link layer module 224 feeds data packets one at a time, along with their associated radio profile, to the MAC layer module 226 for transmission. In this embodiment, the MAC layer module 226 is based on the enhanced CSMA protocol of the present invention.

MAC layer module 226 is in communication with multi-user detection (MUD) compliance module (MCM) 228, which in turn communicates with an MUD-capable physical layer interface 230. The MCM 228 performs what appears to the MAC layer module 226 as virtual and physical carrier sensing of the physical interface 230. In an embodiment, MCM 228 mimics a legacy interface between MAC layer module 226 and a physical layer interface 230, such that the MCM 228 is transparent to the MAC layer module 226. As described below, MCM 228 intercepts a request from the MAC layer module 226 to sense the physical layer module 230. The MCM 228 responds whether the channel 104 can allow another transmission based on the current NAV value for the particular receiving node that is the addressed-to recipient of the data packet from node 102, and the level of contention on the channel 104.

The physical layer module 230 is any MUD-capable physical layer module that can decode two or more packets at least partially simultaneously. For example, physical layer module 230 can employ a code division multiple access (CDMA) technique so as to utilize increasingly available processing power and to reduce extra hardware (e.g., antenna, transceiver, transponder) costs. The physical layer 230 can also employ orthogonal frequency division multiplexing (OFDM), which does not require additional hardware, However, an advantage of CDMA-like approaches over OFDM is that DATA can be transmitted at full-rate (and control packet at a lower rate) without splitting the spectrum and therefore reducing the DATA transmission rate. In both CDMA and OFDM approaches, the codes or spectrums used across overlapping transmissions need not be strictly orthogonal, provided a sufficiently low cross-correlation exits between the codes to enable recovery of the individual signals by suitable signal processing techniques. Other techniques that can be employed include adaptive antenna arrays at the transmitter and receiver ends, multi-input multi-output (MIMO) technology so as to allow space division multiple access (SDMA), or single-input multi-output (SIMO) with a single transmit antenna and multiple receive antennas. In an embodiment, the physical layer module 230 may employ an orthogonal frequency division multiplexing (OFDM) technology for its capability to efficiently utilize the limited RF bandwidth and transmit power in wideband transmission over time-dispersive multi-path channels. Combinations of these multi-user methods, such as the use of MIMO technology combined with OFDM, are also possible. Physical layer module 230 can utilize directional or omnidirectional antennas controlled by a transceiver through a switch. For simplicity, and not by way of limitation, the proceeding description assumes use of omnidirectional antennas. However, directional antennas can be employed without departing from the principles of the invention.

Figure 3:
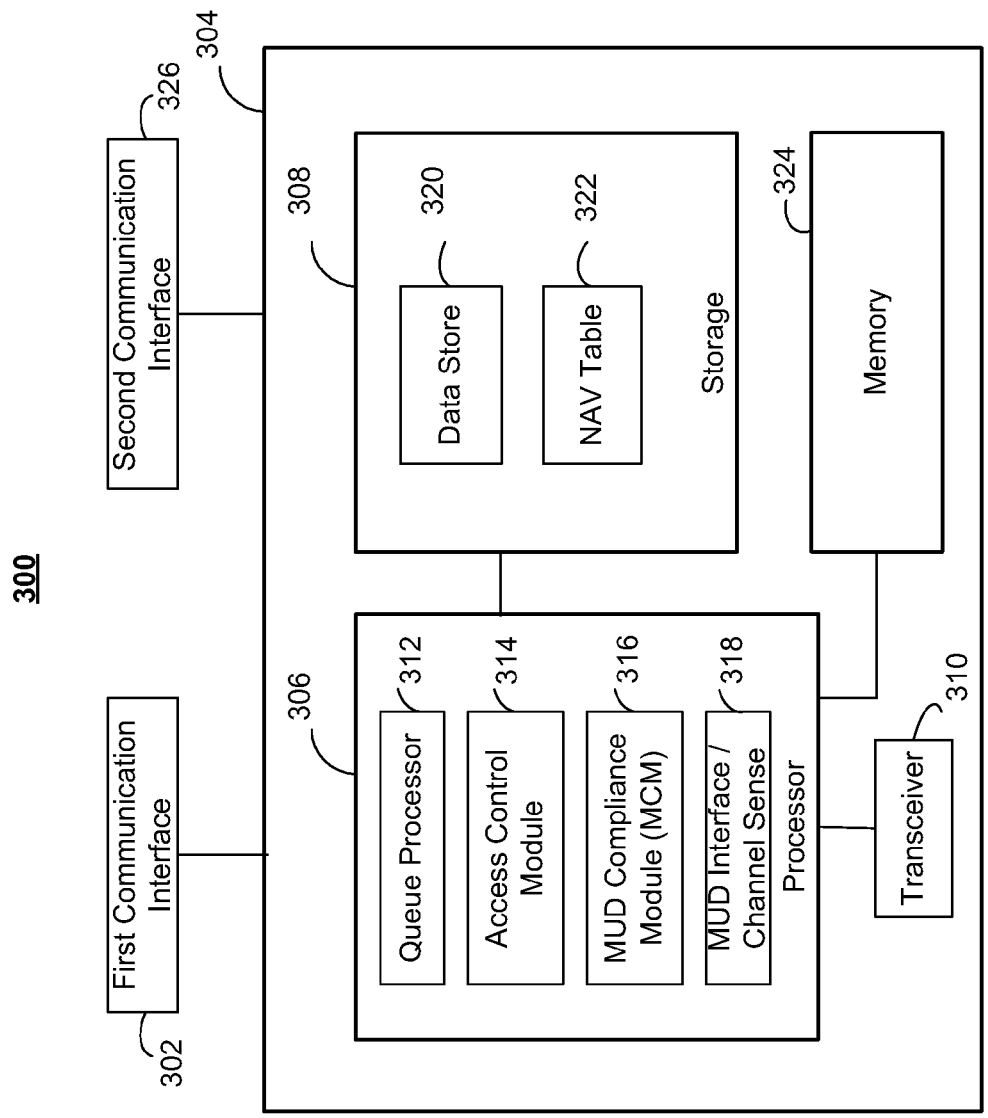
FIG. 3 is a schematic diagram of a system that is employed by a node on the network of FIG. 1, according to an illustrative embodiment of the invention.

FIG. 3 shows a simplified block diagram of a system 300 that can be employed at one or more of nodes 102 in network 100, in accordance with an embodiment of the invention. System 300 includes a control circuitry 304. The control circuitry 304 is in communication with a first communication interface 302 having an input for receiving a data packet and associated radio profile from link layer module 224. The control circuitry 304 is also in communication with a second communication interface 326 having an output for passing a data packet, and any associated primitives (e.g., RTS, ACK) for transmission over channels 104. The control circuitry 304 includes a processor 306, a storage 308, memory 324, and a transceiver 310. Those skilled in the art will appreciate that additional components and connections may be utilized in a particular system 300 in accordance with conventional computer and network device architectures. The processor 306 can be any of a number of well-known computer processors or microprocessors, and may include more than one processor. In addition, the processor 306 can be used to run operating system applications, applications for receiving, transmitting, or processing data in accordance with this invention, and/or any other application. Memory 324 includes computer-readable media for storing computer-readable instructions for performing methods of the invention. The computer readable media can include computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by processor 306. Communication media typically embodies computer readable instructions, data structures, program modules or other data in a modulated data signal and includes any information delivery media, but not including carrier waves. Storage device 308 can be, for example, one or more storage mediums, and includes both volatile and nonvolatile, removable and non-removable media implemented in any method or technology for storage of information. Storage 308 includes, among other things, a data store 320 for storing data packets and a NAV table 322 for storing reservations for nodes neighboring nodes 102. Storage device 308 can be a removable or a fixed storage device, and can store processor-executable instructions for performing a method a method of the present invention. In an embodiment, storage device 308 and memory 324 are combined in a single storage device.

Processor 306 includes queue processor 312 for managing packets awaiting transmission. Queue processor 312 can be based in the link layer module 224. In an embodiment, when two packets are received simultaneously or in overlapping transmissions at the link layer module 224, the queue processor 313 assigns the packet with the larger propagation distance (i.e., that traveled the farthest) a higher priority in a prioritized forwarding queue managed by the link layer module 224. Processor 306 also includes access control module 314. Access control module 314 is part of the MAC layer module 226 (FIG. 2) and controls access to the transmission medium (i.e. channels 104) in accordance with embodiments of the present invention. Access control module 314 can include a carrier-sensing process to detect if the transmission medium is available for the node to transmit a data packet to another one of nodes 102. Access control module 314 can employ both physical sensing and virtual sensing requests to determine channel availability. However, physical sensing of the channel is only useful in a MUD system when n=K−1 (i.e., when all except one of the transmission opportunities is reserved for receiving control packets from hidden nodes). In an embodiment, both the physical sensing and the virtual sensing requests are received and processed by an MUD compliance module (MCM) 316 in communication with the access control module 316 and having an input for receiving the sensing request from the access control module 316. MCM 316 maintains a NAV table 322 that includes a separate entry for the communication status of each one-hop neighbor of node 102. Where the number of transmission opportunities available for targeted communications is greater than 1 (e.g., for K≧2 and n<K−1) each NAV entry is a vector having a vector element for each targeted communication in which the node is engaged. An exemplary NAV table is shown in FIG. 4.

The MCM 322 is further in communication with MUD interface 318 for determining the number of ongoing transmissions on the channel 104. In an embodiment, MUD interface 318 obtains the status of the transmission medium by querying a multi-user detector in the physical layer module to obtain the number of transmissions currently occurring on the channel 104 and provides the channel information to the MCM 316. Based on this information, and the information stored in the NAV table 322, the MCM 316 provides a response to the access control module 316 whether the channel can allow another transmission. In an embodiment, where K=2, or where only one transmission opportunity is reserved for initiating targeted communications, MUD interface 318 also performs the physical sensing aspect of the sensing request from access control module 314. One advantage of system 300 is that MCM 316 can be deployed with a legacy MAC layer protocol, such as existing 802.11 implementations, to leverage the MUD capabilities of the physical layer module without designing an entirely new MAC layer protocol.

Embodiments of the present invention can be implemented as a system, method, or apparatus, which can include software, firmware, hardware, an application-specific integrated circuit (ASIC) or any combination thereof to control a computer or processor-based device to implement aspects detailed herein. The methods, systems, and apparatus of the present invention may also be practiced via communications embodied in the form of program code that is transmitted over a transmission medium, such as over electrical wiring or cabling, through fiber optics, or via any other suitable form of transmission. The program code can be received and loaded into and executed by a machine, such as an EPROM, a gate array, a programmable logic device (PLD), an application-specific integrated circuit (ASIC), etc. When implemented on a general-purpose processor, the program code combines with the control circuitry 304 to provide an apparatus that is configured to invoke the functionality of the present invention. Additionally, any storage units used in connection with the present invention may be a combination of hardware and software.

FIG. 4 is a schematic diagram of the NAV reservation table 322 of the node 300 depicted in FIG. 3, according to an illustrative embodiment of the invention. The NAV table 322 may be maintained by one of nodes 102, e.g., node 102c, to record the status of communications at each one-hop neighbor of the node 102c. Referring to FIG. 1, for the purposes of this discussion, we assume that nodes 102a, 102b, 102i, and 102j are all within the transmission range of node 102c, and are therefore neighbors of 102c. In the NAV table 322, each row 352 corresponds to a separate entry for a neighbor of the node 102c, and each column corresponds to a transmit opportunity of the network 100. Thus, in NAV table 322, entries in the first column correspond to targeted communications on a first transmit opportunity 362, and entries in the second column correspond to targeted communications on a second transmit opportunity 364. In this example, it is assumed that network 100 has a maximum MUD capacity of two (i.e., K=2), and that none of these is reserved for receiving control messages from hidden nodes (i.e., n=0). However, a NAV table 322 can be maintained for any number of neighbors and any combination of K and n. Indeed, because communications from hidden nodes are by definition untargeted, and therefore not recorded in the NAV table, the illustrative NAV table 322 of FIG. 4 could represent the status of targeted communications for any network 100 where K−n=2. Furthermore, while NAV table 322 is illustrated in table form (using rows and columns), other representations, such as dynamic or fixed lists, vectors, matrices, binary strings where each bit in the string corresponds to a transmit opportunity, or a single number that represents the total number of targeted communications in which a neighbor node is engaged.

The NAV reservation table 322 includes four NAV entries: 354, 356, 358, and 360 at time T=0 (i.e., the present). In an embodiment, each NAV entry includes the duration (DUR) of the data transmission from the transmitting node to the receiving node. The NAV entries for each neighbor node of the node 102c may also include a direction (DIR of the communication, indicating whether the respective neighbor node is engaged in the targeted communication as a recipient or a sender of the DATA packet in the CSMA sequence, and where appropriate, an indication of the transmission power (PWR). For example, the NAV entry 354 includes a duration (DUR) for the communication, a direction (DIR) which indicates that node 102a is receiving a packet from node 102e, and a transmit power level for the communication. The remaining NAV entries, 356, 358, and 360, store similar information regarding targeted communication involving node 102b (from node 102b to 102i), and two targeted communications involving node 102i, respectively. However, it is understood that entries in a NAV table may store more or less information regarding targeted communications depending on the particular requirements of network 100. Information regarding the direction of the DATA communication can be used to further improve throughput in the network 100. For example, in an embodiment where the nodes 102 cannot simultaneously transmit and receive packets, a transmitting node can be configured to transmit a packet to a node that is engaged in a targeted communication as a recipient of a DATA packet, and to refrain from such transmissions when the node is engaged in a targeted communication as the sender of the DATA packet. Since node 102j is not currently involved in a targeted communication, the NAV entries for node 102j are currently not set, indicating that node 102c (or another one of nodes 102) may initiate targeted communication with node 102j. Furthermore, each of nodes 102a and 102b has an unused transmit opportunity and, therefore, may be able engage in additional targeted communications.

Figure 5:
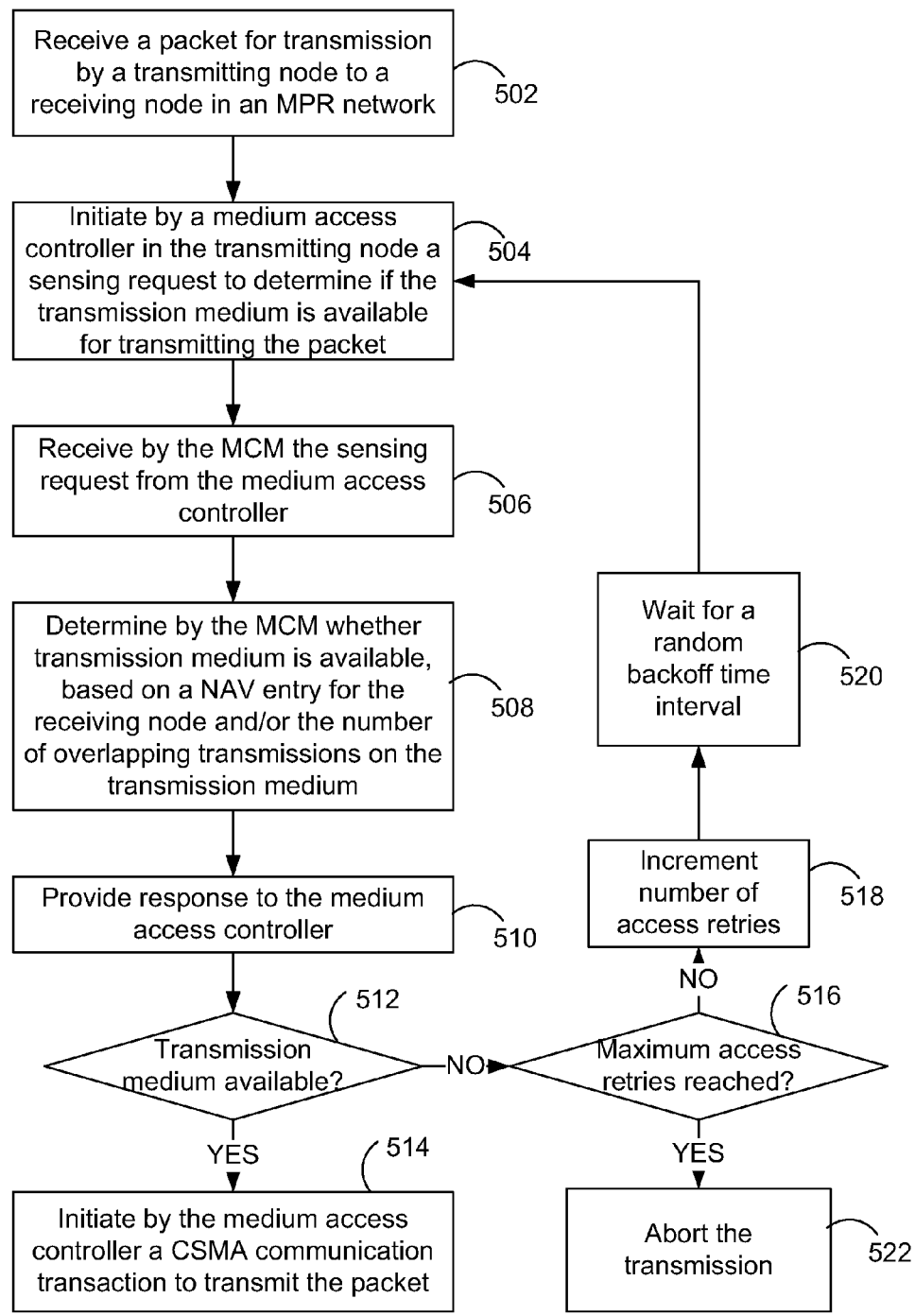
FIG. 5 is a flow chart of an illustrative process that is employed by a node in the network depicted in FIG. 1 to transmit a packet, according to an illustrative embodiment of the invention.

FIG. 5 is a flow chart of an illustrative process 500 that is employed by a node in the network depicted in FIG. 1 to transmit a packet, according to an illustrative embodiment of the invention. In an embodiment, at step 502, a transmitting node 102e receives a packet for transmitting to a receiving node 102a in a wireless ad hoc network 100 that employs multi-packet reception. At step 504, an access controller 314 of the MAC layer module 226 initiates a sensing request to a physical layer module 230 to determine if a transmission medium 104 is available to transmit the packet. At step 506, the sensing request is received or intercepted by an MUD compliance module (MCM) 316. At step 508, the MCM 316 determines whether the transmission medium is available, based on the NAV entries recorded by the receiving node for targeted communications at neighbor nodes, the number of overlapping (targeted and untargeted) transmissions on the medium, or both. The number of overlapping transmissions on the medium can be estimated from NAV information on targeted communications, and knowledge of the two-hop neighborhood topology. It is understood that even though it appears to the MAC layer that physical sensing of the medium occurs in response to the sensing request, physical medium sensing is used only where a conclusive determination regarding the status of the channel cannot be determined based on the NAV entries. In an embodiment, physical sensing of the medium is used only where n=K−1 (i.e., where only one of the K transmission opportunities is used to initiate targeted communications). An illustrative process that can be used by the MCM 316 to determine whether the transmitting node 102e can transmit the packet is described below in relation to FIG. 6. At step 510, the MCM 316 provides a response to the access controller 314.

At step 512, if the MCM 316 determined that the transmission medium is available, the process continues at step 514 where the access controller 314 initiates a transaction (e.g., an RTS/CTS/DATA/ACK transmission sequence) to transmit the packet. At step 512, if the MCM 316 determined that the transmission medium is not available, the process continues at step 516. At step 516, the access controller 516 determines whether a maximum number of medium access retries has been reached. The maximum number of medium access retries can be a fixed or a variable integer, and may be based on the current level of contention on the channels 104. If the maximum number of access retries has been reached, the process continues at step 522, where the transmission is aborted and the upper layers (e.g., link layer module 244) are notified that the transmission was unsuccessful. Otherwise, the process continues at step 518 where the access controller increments a count of the number of access tries. At step 520, the access controller waits a random (or pseudorandom) backoff time, during which it refrains from re-sensing the medium. At the end of the random backoff time, the access controller 314 returns to step 504 to attempt to gain access to the transmission medium.

In practice, one or more steps shown in process 500 may be combined with other steps, performed in any suitable order, performed in parallel (e.g., simultaneously or substantially simultaneously) or removed.

Figure 6:
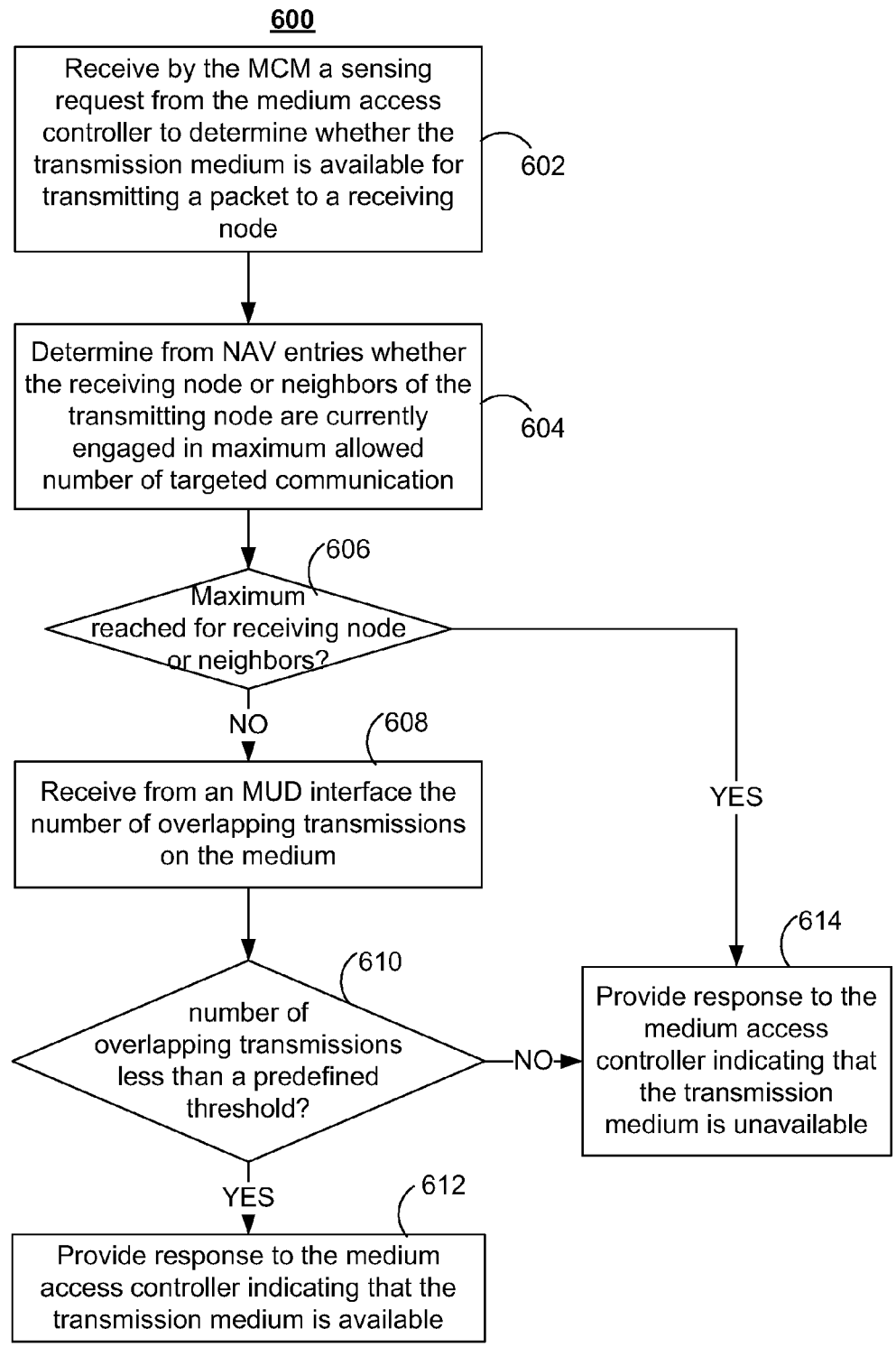
FIG. 6 is a flow chart of an illustrative process that is employed by a node in the network depicted in Figure to determine whether a transmission medium in the network is free for access, according to an illustrative embodiment of the invention.

FIG. 6 is a flow chart of an illustrative process 600 that is employed by an MUD compliance module (MCM) 316 or 228 in a node 102 in the network 100 to determine whether a transmission medium in the network is free for access, according to an illustrative embodiment of the invention. At step 602, MCM 316 receives or intercepts a sensing request from an access controller 314 of the MAC layer module 226 to determine whether the transmission medium 104 is available for transmitting a packet by a transmitting node 102e to a receiving node 102a. The sensing request from the transmitting node 102e can include an identification of the receiving node 102a, a transmission power for the future data transmission, a duration of the transmission, and other information that may be utilized by the MCM 316 to make the determination. The MCM 316 can employ both virtual carrier sensing based on NAV table 322 and physical carrier sensing using MUD interface 318 to determine whether the transmission medium is available for transmitting the packet. At step 604, the MCM 316 checks NAV table 322, which includes a separate entry for each neighbor of the transmitting node 102e, to determine whether the receiving node 102a is currently engaged in the maximum allowed number of communication with another one of nodes 102. Since neighbor nodes of transmitting node 102e have to be able to receive control messages (e.g., an RTS message) reserving a slot for the future communication between nodes 102e and 102a, the MCM 316 also checks to make sure that the neighbors of transmitting node 102e are not currently engaged in the maximum allowed number of communication. At step 606, if all NAV entries for the receiving node 102a are set (indicating the receiving node 102a has no unused transmit opportunities) or if all NAV entries for the one-hop neighbors of transmitting node 102e are set, the MCM 316 proceeds to step 614 where the MCM 316 provides a response to the access controller 314 indicating that the medium is not available. Otherwise, if the NAV entry for the receiving node 102a is not set, the process continues at step 608.

At step 608, the MCM 316 receives from an MUD interface 318 the number of overlapping transmissions on the medium. The MUD interface can improve this estimate to include the number of untargeted communications potentially involving the sender node 102e as well as the number of untargeted communications potentially involving each of the sender node's one-hop neighbors. In an embodiment, the MUD estimates the number of untargeted communications covering a neighboring node using pathloss information, direction of communications in the NAV entries, and knowledge regarding the topology of the two-hop neighborhood. At step 610, the MCM 316 compares the number of overlapping transmissions with a predefined maximum number of allowed overlapping transmissions. In an embodiment, the predefined threshold is set to the maximum total number of transmit opportunities on the transmission medium. In another embodiment, the threshold is dynamically determined based on the types of packets being transmitted. For example, since data packets are transmitted at the maximum rate, the channel may be able support fewer overlapping data transmissions than control packets. In an embodiment, the MCM 316 reserves one or more of the transmit opportunities (n) on a transmission medium 104 for exchanging control packets with hidden nodes. In this embodiment, a transmitting node 102e refrains from transmitting an RTS if it estimates that the additional transmission would cause the number of packets (from targeted or untargeted communications) incident on a neighboring node to exceed the number of transmit opportunities, K−n. For example, the transmitting node 102e may transmit and RTS message (and initiate a new CSMA sequence) only if each one of its neighbors has at least n unused transmit opportunities left. If the number of overlapping transmissions exceeds the threshold, the process continues at step 614 (described above). In an embodiment, the MCM uses different return codes to indicate unavailability of the channel and unavailability of a receiving node, so that the transmitting node may take further action based on the reason for unavailability. For example, the transmitting node 102e can attempt to transmit a different packet to a different one of nodes 102 if the reason for disallowance is that the receiving node 102a is currently in a targeted communication. Otherwise, if the number of overlapping transmissions is less than the threshold, the process continues at step 612 where the MCM 316 provides a response to the access controller 314 indicating that the transmission medium is available.

In practice, one or more steps shown in process 600 may be combined with other steps, performed in any suitable order, performed in parallel (e.g., simultaneously or substantially simultaneously) or removed.

Figure 7:
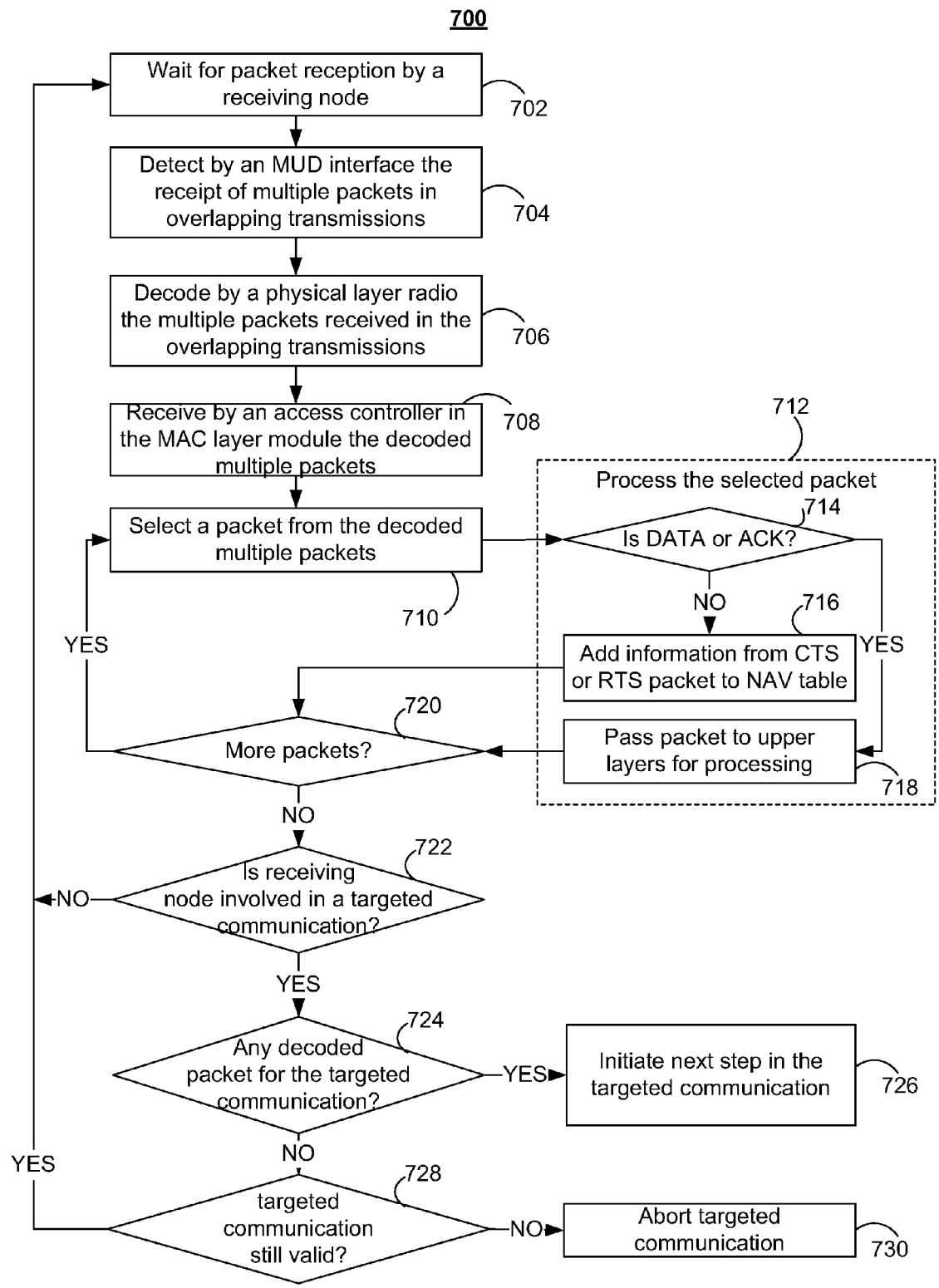
FIG. 7 is a flow chart of an illustrative process that is employed by a receiving node in the network to receive multiple packets in overlapping transmissions, according to an illustrative embodiment of the invention.

FIG. 7 is a flow chart of an illustrative process 700 that is employed by a receiving node 102a in the network 100 to receive multiple packets in overlapping transmissions, according to an illustrative embodiment of the invention. At step 702, a receiving node 102a waits for a reception of a packet. The receiving node 102a can be an idle node not currently engaged in a targeted communication, or a node awaiting a packet (e.g., an RTS, a DATA, a CTS, or an ACK) in a targeted communication sequence Importantly, here "receiving" refers to the physical layer module radio function of expecting a transmitting frame. At the MAC layer module level, the receiving node 102a can be the sender or the target of an RTS/CTS handshake sequence. At step 704, an MUD interface 230 detects multiple packets that are transmitted in overlapping transmissions over the transmission medium of the physical layer module. A radio receiver (e.g., transceiver 310) in the physical layer module successfully decodes the multiple packets at step 706 and provides the decoded packets to the access controller 314 at step 708. In an embodiment, the MUD interface 230 can filter the received content to isolate a control packet from a data packet, and provide the separate packets to the access controller 314. The MUD interface 230 can also filter received content to isolate multiple DATA packets. However, overlapping transmissions of DATA packets generally occur at the expense of transmission at a higher data rate, and may not be desirable in an application that seeks to maximize utilization of available bandwidth. Thus, in embodiments of the present invention, it is assumed that DATA packets are transmitted at the maximum allowed rate, while control packets are transmitted a lower/reduced rate. This makes it possible to receive and decode simultaneously a DATA packet and a control packet without sacrificing the transmit data rate for DATA packets. In conventional CSMA, the access controller 314 automatically aborts any ongoing transmissions upon receiving a packet in the presence of another transmission. However, in the present invention, the collision avoidance logic in the access controller 314 is enhanced so that simultaneous transmissions or interferences do not automatically result in a loss of both transmissions. In one specific embodiment, where there are hardware limitations, the receiver 310 of the physical layer module 230 can decode up to two control packets, or a control packet and a data packet simultaneously. In such embodiments, the detection of more than two overlapping DATA transmissions can cause all transmissions involved to fail. In other embodiments, the receiver 310 can decode more than two DATA packets.

At step 710, the access controller 314 selects a first one of the decoded packets for processing at step 712. Processing a packet at step 712 includes steps 714, 716, and 718, and can include various additional functions depending on the nature of the selected packet. At step 714, the access controller 314 determines whether the received packet is a DATA or ACK packet. If so, the packet is passed to the upper layers (e.g., the link layer module 224) for processing. Otherwise, if the packet is a CTS or an RTS packet, the access controller 314 provides the packet to the MUD compliance module (MCM) 316 which adds the information from the packet to the NAV table 322. As described above, the information from an RTS or CTS packet can include an expected duration of the associated future data transmission, and identification of the sender and target node of the data transmission. The MCM 316 updates the corresponding entries for the identified nodes based on the duration and other information specified in the packet. After processing the selected packet (whether by passing to the upper layers at step 718, or by updating the NAV table at step 716) the process continues at step 720. At step 720, if more packets remain to be processed, the process returns to step 710 to select the next packet. Otherwise, the process 700 continues at step 722.

The steps from 722 to 730 determine the fate of any targeted communications involving the receiving node 102a in light of the received packets. Specifically, at step 722, if the receiving node 102a is not involved in a targeted communication (either prior to receiving the packets at step 708, or as a result of receiving such packets), the process returns to 702, where the receiving node awaits another packet, possibly in an idle state. Otherwise, if the receiving node 102a is already involved in a targeted communication, the process continues at step 724 to determine if any of the received packets correspond to an expected packet in the targeted communication sequence. For example, if transmitting node 102e is the sender in an RTS/CTS/DATA/ACK sequence, the node may be expecting a CTS or an ACK packet depending on the progression of the sequence. On the other hand, if the receiving node 102a is the target in the targeted communication sequence, the node may be expecting a DATA packet depending on the progression of the sequence. If the receiving node 102a is idle, and not already involved in a targeted communication, the node may be said to be expecting an RTS packet that would initiate a targeted communication sequence between the receiving node 102a and the transmitting node 102e. At step 724, if any one of the received packets corresponds to an expected packet in the targeted communication sequence, the process continues at step 726 where access controller 314 initiates a next step in the targeted communication sequence, if necessary. Otherwise, the process continues at step 728.

At step 728, the access controller 314 determines if the targeted communication is still valid. The targeted communication may be invalid if a timer that tracks the waiting interval (e.g., the short inter-frame space (SIFS)) expired without receiving the expected packet. In addition, the receiving node 102a may sense whether the medium is busy (indicating that a packet that is potentially addressed to the receiving node is being transmitted). If the receiving node senses that the channel is free, it may trigger a reception failure. The targeted communication may also be invalid if a NAV conflict is detected. If at step 728, the targeted communication is valid, the receiving node returns to step 702 to continue waiting for the expected packet. Otherwise, the process continues at step 730 where the access controller 314 aborts the targeted communication and sends a reception failure notification to the upper layers of the receiving node.

In practice, one or more steps shown in process 600 may be combined with other steps, performed in any suitable order, performed in parallel (e.g., simultaneously or substantially simultaneously) or removed.

The invention may be embodied in other specific forms without departing from the principles or essential characteristics thereof. The foregoing embodiments are therefore to be considered in all respects illustrative, rather than limiting of the invention.

What is claimed is:

1. A receiving node in a wireless ad hoc network that employs multi-packet reception, the receiving node comprising:
   a physical layer radio configured to, while in the process of a CSMA communication exchange, decode multiple packets received in overlapping transmissions being transmitted over a wireless transmission medium;
   an access controller in a media access control (MAC) layer module of the receiving node configured to:
      receive the decoded multiple packets from the physical layer radio while the receiving node is involved in a targeted communication transaction with a first transmitting node,
      detect that at least one of the decoded multiple packets is associated with an untargeted communication from one or more second transmitting nodes, and
      process the at least one or more packets without aborting the targeted communication transaction; and
   a multi-user detection compliance module (MCM) configured to maintain a plurality of network allocation vector (NAV) entries each comprising a plurality of communication status entries for respective one-hop neighbor nodes of the receiving node, wherein each communication status entry includes a duration, a direction, and a transmit power level associated with a targeted communication in which the one-hop neighbor is involved.

2. The receiving node of claim 1, wherein a remaining one of the decoded multiple packets is associated with the targeted communication between the receiving node and the first transmitting node.

3. The receiving node of claim 2, wherein the remaining one of the decoded multiple packets comprises a data packet, and the MAC layer module is configured to transmit an acknowledgement (ACK) message to the first transmitting node indicating that the data packet was successfully received, despite receiving the decoded multiple packets.

4. The receiving node of claim 1, wherein the at least one of the decoded multiple packets comprises a request to send (RTS) or a clear to send (CTS) control packet associated with the untargeted communication, and the access controller is configured to process the at least one of the decoded multiple packets by updating a network allocation vector (NAV) entry for each of the one or more second transmitting nodes based on the RTS or CTS packets.

5. The receiving node of claim 1, wherein the decoded multiple packets include at most two control packets.

6. The receiving node of claim 1, further comprising a forwarding layer module configured to:
   receive the decoded multiple packets; and
   place the multiple packets in a prioritized forwarding queue, wherein the prioritized queue gives a higher priority to the packet that has traveled the farthest distance.

7. The receiving node of claim 1, wherein each packet in the at least one of the decoded multiple packets includes a duration of a respective future data transmission to or from the one more second transmitting nodes, and the MAC layer module is configured to:
   set the respective NAV entry for each of the one or more second transmitting nodes based on the respective duration.

8. The receiving node of claim 1, wherein the first transmitting node is configured to transmit a request to send (RTS) packet to the receiving node during targeted communication involving at least one other node in a transmission range of the first transmitting node.

9. The receiving node of claim 1, wherein the receiving node is capable of receiving a predefined maximum number of packets simultaneously in overlapping transmissions, and the receiving node is configured to refrain from transmitting a packet if the number of overlapping communications on the wireless transmission medium equals or exceeds the predefined maximum.

10. The receiving node of claim 1, wherein the multi-user detection compliance module (MCM) is in communication with the access controller and the wireless transmission medium, the physical layer radio is configured to decode up to a maximum number of packets received in overlapping transmissions on the wireless medium, and the MCM is configured to reserve a portion of the maximum number for receiving control packets from hidden nodes of the receiving node.

11. The receiving node of claim 1, wherein the wireless ad hoc network utilizes a code division multiple access (CDMA) technique to achieve multi-packet reception.

12. The receiving node of claim 11, wherein the overlapping transmissions are transmitted using different transmit powers, but on an identical same CDMA code or signature.

13. A transmitting node in a wireless ad hoc network that employs multi-packet reception, the transmitting node comprising:
   an access controller configured to initiate a sensing request to determine whether a wireless transmission medium is available for transmitting a packet by the transmitting node to a receiving node;
   a multi-user detection (MUD) interface configured to detect a number of overlapping transmissions on the wireless transmission medium of the wireless network; and a
   a MUD compliance module (MCM) in communication with the access controller and the MUD interface, the MCM configured to:
      receive the sensing request from the access controller,
      maintain a plurality of network allocation vector (NAV) entries each comprising a plurality of communication status entries for respective one-hop neighbor nodes, wherein each communication status entry includes a duration, a direction, and a transmit power level associated with a targeted communication in which the one-hop neighbor is involved, and
      provide a response to the access controller based on one or more of the NAV entries maintained by the MCM for the receiving node and the number of overlapping transmissions on the wireless transmission medium.

14. The transmitting node of claim 13, wherein the MCM is configured to permit the transmitting node to transmit the packet in the presence of other transmissions on the transmission medium.

15. The transmitting node of claim 13, wherein the MCM is configured to prevent the transmitting node from transmitting if the receiving node is involved in one or more targeted communications with another node, even in the absence of other transmissions on the wireless transmission medium.

16. The transmitting node of claim 13, wherein the receiving node is configured to decode up to a maximum number packets received in overlapping transmissions, and the MCM is configured to reserve a portion of the maximum number for receiving control packets from hidden nodes of the transmitting node or the receiving node.

17. The transmitting node of claim 13, wherein the wireless ad hoc network utilizes a code division multiple access (CDMA) technique to achieve multi-packet reception.

18. The transmitting node of claim 17, wherein the overlapping transmissions are transmitted using different transmit powers, but on an identical same CDMA code or signature.

19. A wireless network that employs multi-packet reception, the network comprising:
  a transmitting node configured to transmit a control packet over a wireless transmission medium to a receiving node, while other nodes within a transmission range of the transmitting node are involved in ongoing communication, the control packet indicating a duration of a future transmission of a data packet; and
  the receiving node configured to
    receive the control packet while simultaneously receiving a second packet from a second transmitting node,
    record the duration of the future transmission of the data packet in a network allocation vector (NAV) table that includes a separate communication status entry for each of one or more transmitting nodes, wherein each communication status entry includes the duration, a direction, and a transmit power level associated with a targeted communication in which the transmitting node is involved, and
    predict a future time that the receiving node can initiate a transmission to the transmitting node based on the recorded duration, without aborting the receiving of the second packet.

20. The wireless network of claim 19, wherein the control packet comprises a request-to-send (RTS) packet or a clear-to-send (CTS) packet.

21. The wireless network of claim 19, wherein the second packet is a data packet or another control packet.

22. The wireless network of claim 19, wherein the second packet is associated with a targeted communication between the receiving node and another node.

23. A method of communicating in a wireless ad hoc network that employs multi-packet reception, the method comprising:
  receiving by a receiving node at least two packets in overlapping transmissions over a wireless transmission medium;
  detecting by the receiving node that a first one of the at least two packets is associated with a targeted communication between the receiving node and a first transmitting node,
  detecting by the receiving node that a remaining ones of the at least two packets are associated with an untargeted communication from one or more second transmitting nodes, and
  processing by the receiving node the remaining ones of the at least two packets without aborting the targeted communication, and
  maintaining by the receiving node a network allocation vector (NAV) table entries each comprising a plurality of communication status entries for respective one-hop neighbor nodes of the receiving node, wherein each communication status entry includes a duration, a direction, and a transmit power level associated with a targeted communication in which the one-hop neighbor is involved.

24. The method of claim 23, wherein the remaining ones of the at least two packets comprises request to send (RTS) or a clear to send (CTS) control packet, and processing the remaining ones of the at least two packets comprises updating the NAV table based on the RTS or CTS packets.

25. The method of claim 23, wherein the first one of the at least two packets comprises a data packet, the method further comprising:
  transmitting by the receiving node an acknowledgement (ACK) message to the first transmitting node indicating that the data packet was successfully received, despite detecting the remaining packets.

26. The method of claim 23, wherein the at least two packets include at most two control packets, the method further comprising: decoding by the receiving node the at most two control packets simultaneously.

27. The method of claim 23, further comprising placing the at least two packets in a prioritized forwarding queue, wherein the prioritized queue gives a higher priority to the packet that has traveled the farthest distance.

28. The method of claim 23, further comprising:
  setting the respective NAV entry for a neighbor node to a duration of a targeted communication involving the neighbor node; and
  clearing the respective NAV entry for the neighbor node if the neighbor node is not involved in a targeted communication.

29. The method of claim 23, further comprising transmitting by the first transmitting node a request to send (RTS) packet to the receiving node during ongoing communication involving at least one other node in a transmission range of the first transmitting node.

30. The method of claim 23, further comprising refraining from transmitting a packet if the number of overlapping communications on the wireless transmission medium equals or exceeds a predefined maximum.

31. The method of claim 23, wherein the receiving node is configured to simultaneously decode up to a predefined maximum number packets received in the overlapping transmissions, the method further comprising:
  reserving a portion of the maximum number for receiving control packets from one or more hidden nodes of the receiving node.

32. The method of claim 31, further comprising:
  reserving the remaining maximum number of packets for exchanging communication between the receiving node and one-hop neighbors of the receiving node.

* * * * *

UNITED STATES PATENT AND TRADEMARK OFFICE
CERTIFICATE OF CORRECTION

PATENT NO. : 8,406,175 B2
APPLICATION NO. : 12/709330
DATED : March 26, 2013
INVENTOR(S) : Santivanez et al.

It is certified that error appears in the above-identified patent and that said Letters Patent is hereby corrected as shown below:

In the Claims:

At column 18, line 37, claim 13, delete "a".

Signed and Sealed this
Ninth Day of July, 2013

Teresa Stanek Rea
*Acting Director of the United States Patent and Trademark Office*